United States Patent Office 3,235,322
Patented Feb. 15, 1966

3,235,322
DYEING OF POLYOLEFIN FIBERS IN
FAST COLOURS
Ryukichi Tanaka, Kazuhiro Teramura, Seichiro Yokoyama, and Keizo Miyamoto, Kyoto, and Shinpei Itoh, Tokyo, Japan, assignors to Nitto Boseki Co., Ltd., Fukushima-shi, Japan, a corporation of Japan
No Drawing. Filed July 30, 1963, Ser. No. 298,561
Claims priority, application Japan, Aug. 10, 1962, 37/33,066; Nov. 20, 1962, 37/50,900
3 Claims. (Cl. 8—39)

This invention relates to a process for the dyeing of polyolefin fibers. More particularly it relates to a process for the dyeing of polyolefin fibers by employing a specific anthraquinone dye.

Hydrophobic property of fibers made of polyolefin like polyethylene and polypropylene is due to their molecular structure of high regularity and their paraffinic nature. Consequently it is necessary to introduce not only aliphatic higher alkyl radical but also paraffinic nature into structure of a dyestuff molecule to obtain the dyestuff having enhanced affinity to hydrophobic high polymers.

With an intention of finding characteristic dyestuffs suitable to polyolefin we have been working on synthesis of various kind of anthraquinone dye and investigating the effect of structure on the affinity of dye. As the result, dyestuffs expressed by following chemical structures (C.I. Disperse Blue 23 and Blue 3)

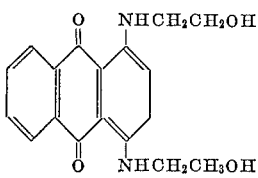 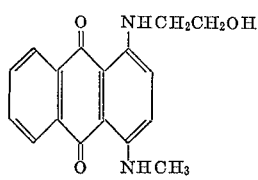

are found to be unsuitable to polypropylene having strong hydrophobic property due to the influence of relatively hydrophillic nature of hydroxyethyl groups. Even dyestuffs having relatively strong hydrophobic nature, e.g., disperse dyes having no hydroxyethyl groups as shown by following chemical structure (C.I. Disperse Red 15 and Violet 1),

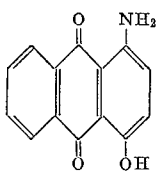 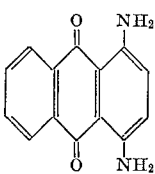

affinity to polyolefin is found to be poor on account of the influence of primary amine group contained in their molecules. Also N-substituent of anthraquinone like compounds expressed as follows

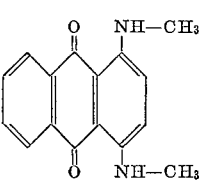 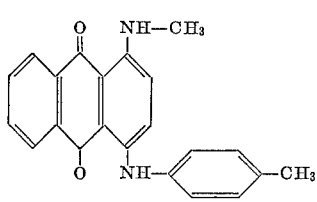

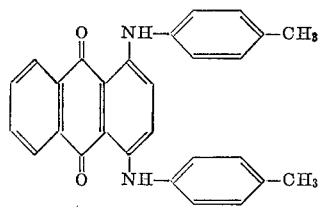

has still poor dyeing affinity to polyolefin.

These facts show that increase of hydrophobic property of dyestuff alone does not improve dyeing affinity to polyolefin. Accordingly we must pay attention to the fact that polyolefins have characteristic properties of being hydrophobic due to hydrocarbon polymer and of having no functional group to bind with dyestuff. From these points following methods can be conceived.

(1) Enhancement of affinity to polyolefins having paraffinic property by imparting paraffinic property to dyestuff itself by introducing alkyl group.

(2) Enhancement of affinity to polyolefin by introducing a specific radical which has special selectivity to polyolefin.

We pointed out one time on the report of Journal of Textile Society of Japan, No. 18, vol. 6 [1962], that Japanese patent publication No. Sho. 36/24,235 that dyestuffs having relatively large paraffinic property, e.g., those as shown by following general formula have excellent dyeing property to polypropylene fiber from the standpoint of (1)

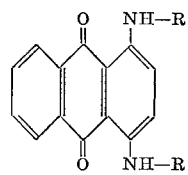

(R is alkyl radical of more than 4 carbon atoms.)

This type of dyestuffs shows excellent dyeing affinity to polyolefin, but they cannot be called commercially perfect dyestuffs because the fastness of dyed substance is not satisfactory. Especially, poor light fastness and the fastness to dry cleaning are serious disadvantages.

We changed our attention to the method (2) in searching for substitution radicals which exhibit effective dyeing affinity to polyolefin, among various anthraquinone derivatives, and found that following dyestuffs show excellent dyeing affinity and fastness.

The dyestuffs useful in our method are those anthraquinone dyes containing in at least one of the alpha positions, at least one hydroxyphenylamino radical

The anthraquinone neuclus may contain other atoms or radicals like halogen, alkyl, —OH, —NH$_2$, —NHR—

(wherein R and R' are alkyl, substituted alkyl, cycloalkyl aralkyl and aryl radicals).

As these dyestuffs contain phenolic hydroxy radical, carrier-like property against polyolefin is added and thereby dyeing affinity is increased. In addition, basic property due to amino group is reduced, by which presumably favorable effect is given to fastness of dyed substance. Of these anthraquinone dyes, the greater the paraffinic property of dye, the deeper the colour of dyed substance is. This is the proof of simultaneous effect of above-mentioned two methods.

We have further found in our basic study that aniline

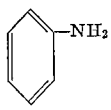

is not adsobred but alkyl aniline like

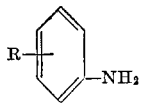

can be adsorbed as the length of alkyl radical chain increases and hydrophobic and paraffinic properties are increased. We applied this tendency to anthraquinone dye, as follows. Methyl anthraquinone, methyl amino anthraquinone or their derivatives like those shown by following formula

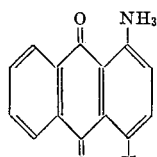 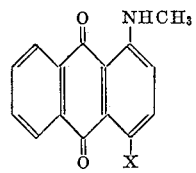

(wherein X=H, OH, $NH_2$, $NHCH_3$, etc.) cannot be adsorbed on polypropylene fiber, but even in these compounds if hydrophobic and paraffinic properties are enhanced by introducing alkyl radical having suitable numbers of carbon atoms in the beta position of anthraquinone nucleus they show good affinity to fiber and can be adsorbed. This effect is especially great when the number of carbon atoms in alkyl radical is large.

Further we have made research about the effect of substitution radicals in alpha position of beta alkyl anthraquinone upon dyeing affinity and found that we can dye polyolefin like polypropylene into fast colour by making them contain hydroxyphenyl amino radical

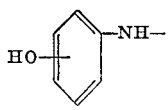

Dyestuffs applicable to the method of this invention belong to beta-alkylanthraquinone as expressed by following general formula which have large paraffinic property and contain at least one hydroxyphenyl amino radical in alpha-position.

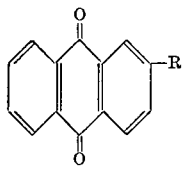

(R is alkyl radical containing more than 3 carbon atoms). In the anthraquinone nucleus and/or phenyl nucleus may contain substitution atom or radical like hydroxyamino, alkylamino, arylamino alkylarylamino, aralkylamino, cycloalkylamino, halogen or alkyl.

By employing dyestuffs we have invented, it is possible to dye hydrophobic high polymer at a temperature of from room temperature to 100° C. or higher than 100° C. It is also possible to employ swelling agent like carrier or other dyeing assistant.

In case of polyolefin fiber it is preferable to effect dyeing in aqueous medium in which a dyestuff is emulsified and dispersed by a suitable surfactant. Any temperature from room temperature to 100° C. gives satisfactory results. If dyeing assistant like suitable carrier is simultaneously used, or if high temperature is applied in case of relatively heat resisting polymer like polypropylene, better dyeing effect is attainable. Application of thermosol method at suitable condition affords also good result. Constitutional formulas of anthraquinone dyes related to our invention are shown as follows:

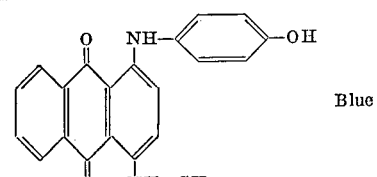

Blue

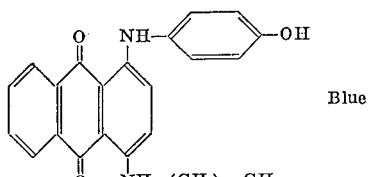

Blue

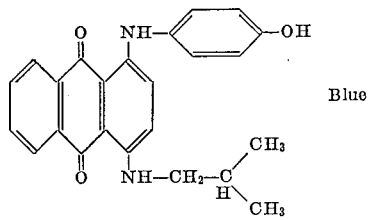

Blue

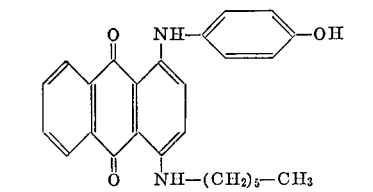

Blue

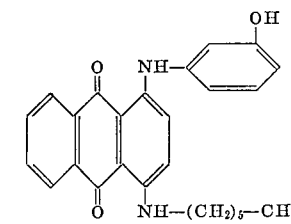

Reddish blue

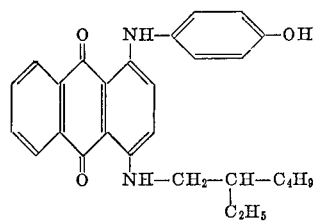

Blue

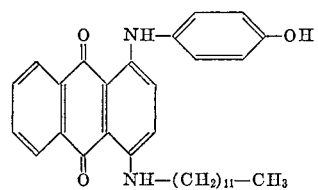

Blue

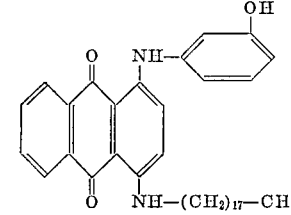

Reddish blue

| | |
|---|---|
| 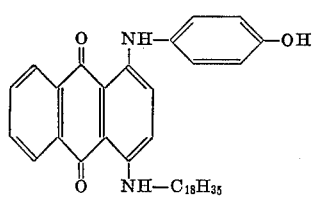 Blue | 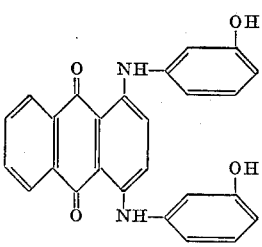 Violet |
| 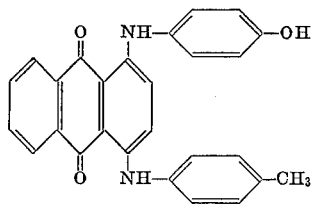 Blue | 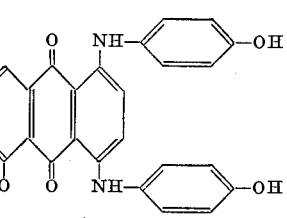 Blue |
| 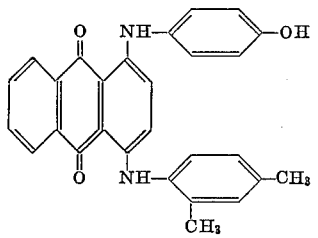 Blue | 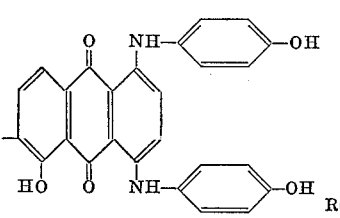 Reddish blue |
| 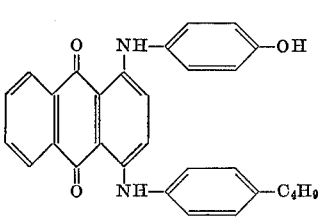 Blue | 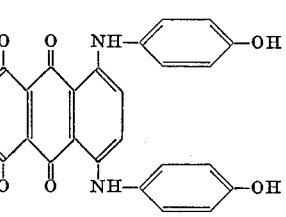 Violet |
| 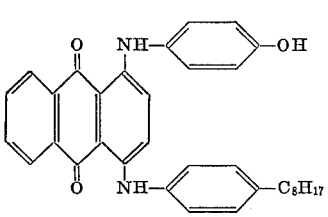 Blue | 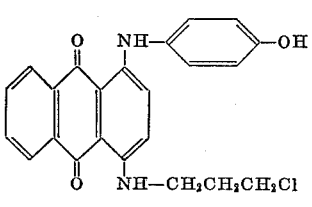 Blue |
| 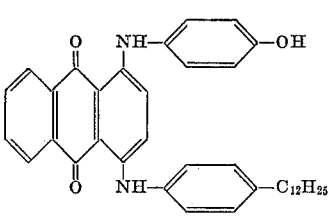 Blue | 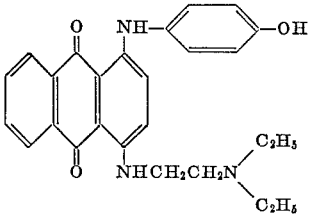 Violet |
| 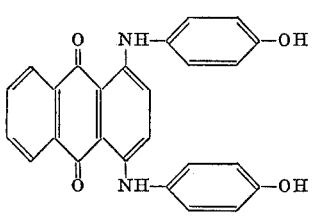 Blue | 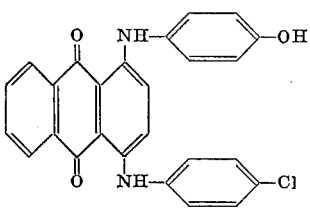 Blue |
| 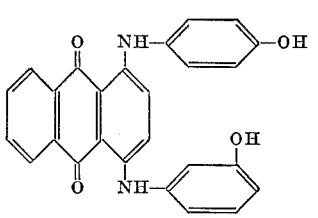 Reddish blue | 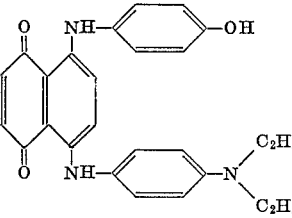 Violet |

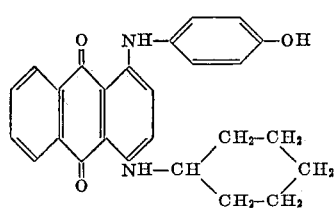
5
Blue
10
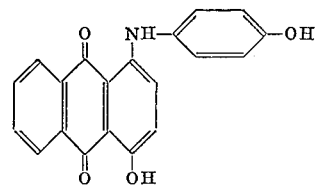
15
Violet
20
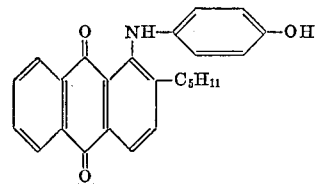
25
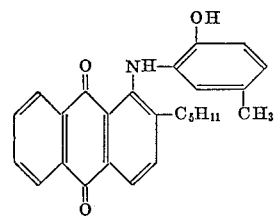
30
35
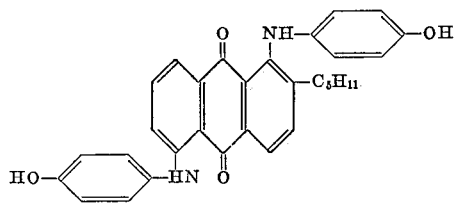
40
45
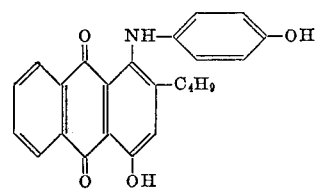
50
55
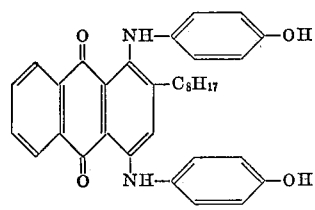
60
65
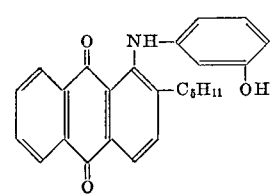
70
75
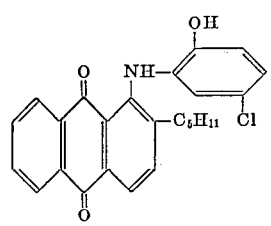
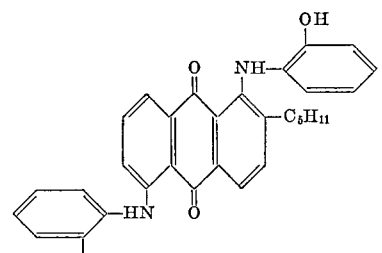
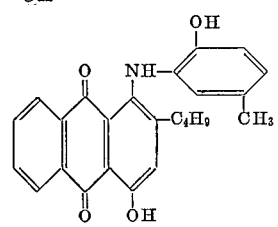
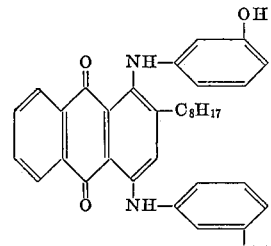
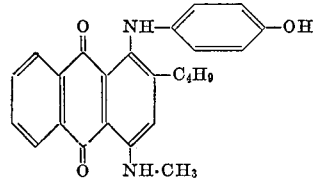
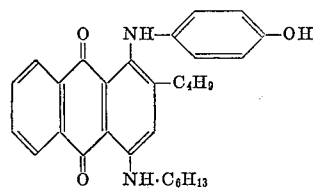
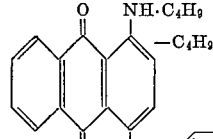
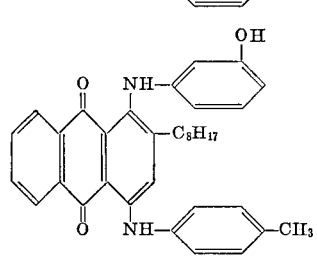

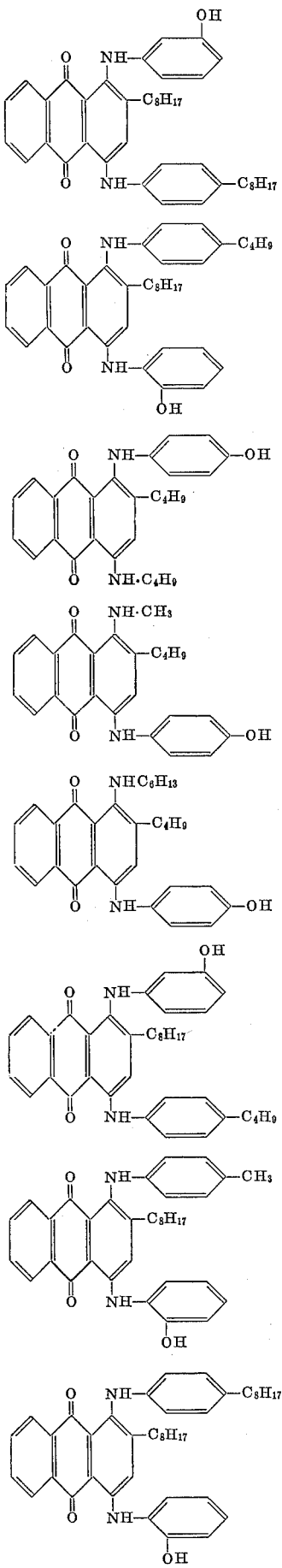

Following examples to show the embodiment of this invention.

Example 1

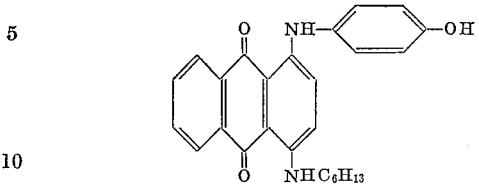

100 g. of polypropylene fiber is immersed in a dye bath made by dispersing 5 g. of the dyestuff having above formula and 5 g. of trichlorobenzene in 3 l. of an aqueous solution containing 6 g. of N-stearoyl-N-methyltaurine so as to become emulsion. The dyeing is carried out at a temperature of from 90° C. to 100° C. for 1.5 hours. The fiber is then washed by washing solution containing 5 g./l. of N-stearoyl-N-methyltaurine with fiber to solution ratio of 1:30 at a temperature of from 70° to 80° for 30 minutes. After hot water washing followed by cold water washing, a blue colour is obtained.

Example 2

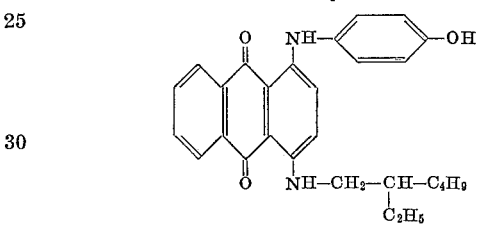

100 g. of polypropylene fiber is immersed in a dye bath made by dispersing 5 g. of the dyestuff having above formula in 3 l. of an aqueous solution containing 6 g. of N-stearoyl-N-methyltaurine so as to become emulsion. The dyeing is carried out at a temperature of 120° C. for 1.5 hours in a tightly closed vessel. By proceeding as described in Example 1, a blue colour is obtained.

Example 3

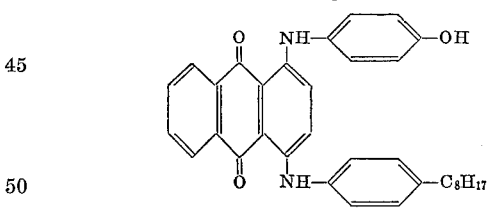

100 g. of polypropylene fiber is immersed in a dye bath made by dispersing 5 g. of the dyestuff having above formula in 5 l. of aqueous solution containing 10 g. of N-stearoyl-N-methyltaurine so as to become emulsion. The dyeing is carried out in a tightly closed vessel at a temperature of 125° C. for 1 hour. By proceeding as described in Example 1 a greenish blue colour is obtained.

Example 4

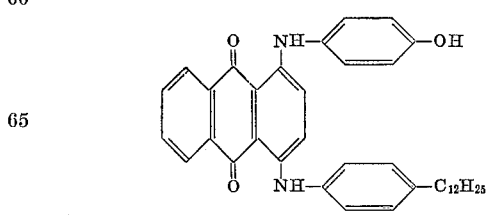

100 g. of polypropylene fiber is immersed in a dye bath made by dispersing 5 g. of the dyestuff having above formula and 5 g. of diethylaniline in 3 l. of aqueous solution containing 6 g. of N-stearoyl-N-methyl taurine so as to become emulsion. The dyeing is carried out at a temperature of from 95° C. to 100° C.

for 1.5 hours. By proceeding as described in Example 1 a greenish blue colour is obtained.

*Example 5*

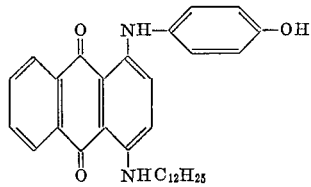

100 g. of polypropylene fiber is immersed in a dye bath made by dispersing 10 g. of the dyestuff having above formula in 3 l. of an aqueous solution containing 6 g. of N-stearoyl-N-methyl taurine so as to become emulsion. The dyeing is carried out at a temperature of from 90° C. to 100° C. for 2 hours. By proceeding as described in Example 1, a blue colour is obtained.

*Example 6*

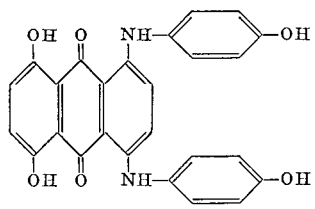

100 g. of polypropylene fiber is immersed in a dye bath made by dispersing 5 g. of the dyestuff having above formula in 3 l. of an aqueous solution containing 10 g. of N-stearoyl-N-methyl taurine so as to become emulsion. The dyeing is carried out under pressure at a temperature of 120° C. for 2 hours. By proceeding as described in Example 1, a violet colour is obtained.

*Example 7*

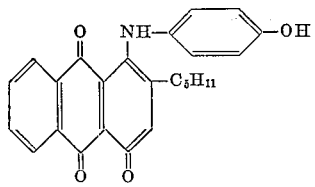

5 g. of the dyestuff having above formula and 5 g. of trichlorobenzene is dispersed to emulsion in 3 l. of aqueous solution of dispersing agent containing 6 g. of N-stearoyl-N-methyl taurine. Into this dyeing bath, 100 g. of polypropylene fiber is introduced and the dyeing is carried out at a temperature of from 90° C. to 100° C. for 1.5 hours. By proceeding as described in Example 1, a red colour is obtained.

*Example 8*

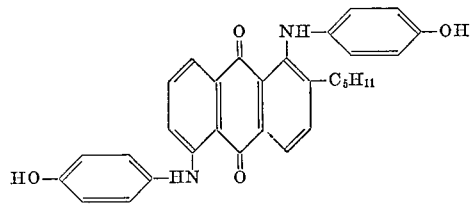

5 g. of the dyestuff having above formula and is dispersed to emulsion in 3 l. of an aqueous solution of dispersing agent containing 6 g. of N-stearoyl-N-methyl taurine. Into this dyeing bath, 100 g. of polypropylene fiber is introduced and the dyeing is carried out in a tightly closed vessel at a temperature of 120° C. for 1.5 hours. By washing as described in Example 1, a bordeaux colour is obtained.

*Example 9*

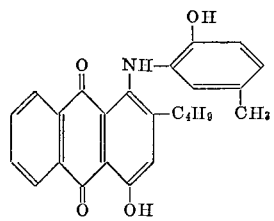

5 g. of the dyestuffs having above formula is dispersed to emulsion in 5 l. of aqueous solution of dispersing agent containing 10 g. of N-stearoyl-N-methyl taurine. Into this dyeing bath 100 g. of polypropylene is introduced and dyeing is carried out in a tightly closed vessel at a temperature of 125° C. for 1 hour. By washing as described in Example 1, a violet colour is obtained.

*Example 10*

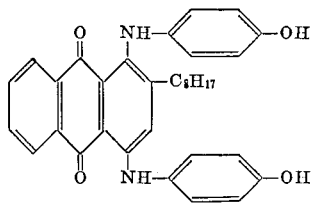

5 g. of the dyestuff having above formula and 5 g. of diethyl aniline are dispersed to emulsion in 3 l. of an aqueous solution of dispersing agent containing 6 g. of N-stearoyl-N-methyl taurine. Into this dyeing bath, 100 g. of polypropylene fiber is introduced and the dyeing is carried out at a temperature of from 95° C. to 100° C. for 1.5 hours. By washing as described in Example 1, a blue colour is obtained.

*Example 11*

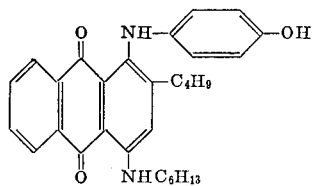

10 g. of the dyestuff having above formula is dispersed to emulsion in 3 l. of an aqueous solution of dispersing agent containing 10 g. of N-stearoyl-N-methyl taurine. Into this dyeing bath 100 g. of polypropylene fiber is introduced and the dyeing is carried out at a temperature of from 90° C. to 100° C. for 2 hours. By washing as described in Example 1, a blue colour is obtained.

*Example 12*

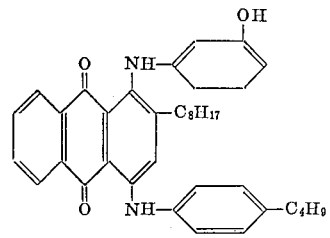

5 g. of the dyestuff having above formula is dispersed in 5 l. of an aqueous solution containing 10 g. of N-stearoyl-N-methyl taurine. Into this dyeing bath, 100 g. of polypropylene fiber is introduced and the dyeing is carried out under pressure at a temperature of 120° C. for 2 hours. By washing as described in Example 1, a green colour is obtained.

Example 13

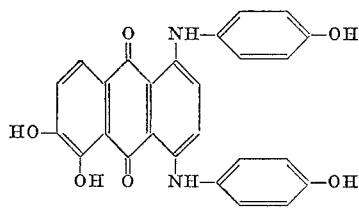
(A)

0.15 g. of the dyestuff having above formula is dispersed in 100 cc. of aqueous solution containing 0.2 g. of dispersing agent having formula of

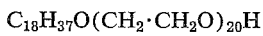
$C_{18}H_{37}O(CH_2 \cdot CH_2O)_{20}H$

Into this dyeing bath 3 g. of polypropylene fiber is introduced and the dyeing is carried out at a temperature of from 90° C. to 100° C. for 1 hour. After dyeing the fiber is soaped at a temperature of from 70° C. to 80° C. and then washed by water. Mordant dyeing is carried out as follows:

(a) Dyed fiber is padded in aqueous solution of from 2 to 5 percent $Ni(SCN)_2$ and picked up so as to be from 80 to 100 percent by weight of fiber. After dried in air, it is steamed at a pressure of from 0 to 5 lbs./in.² for 10 minutes. Further it is washed by water at a temperature of from 60° C. to 80° C. and dried.

(b) Dyed fiber is introduced in 100 cc. of bath containing 0.2 g. of potassium bichromate and 0.2 g. of formic acid and treated at a temperature of from 90° C. to 100° C. for 1.5 hours.

(c) 0.3 g. of cuprous acetate is dissolved in 100 cc. of water. Into this solution, dyed fiber is introduced and treated at 125° C. for 1 hour.

Example 14

(a) 0.3 g. of aluminum stearate is dispersed in a solution containing 0.3 g. of dispersing agent having formula of

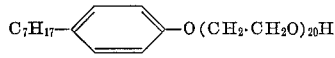

Into this solution 3 g. of propylene fiber is introduced and treated at 125° C. for 1 hour. Soaping is lightly performed at a temperature of about 60° C.

(b) 0.5 g. of trichlorobenzene is emulsified in 100 cc. of water containing 0.2 g. of N-stearoyl-N-methyl taurine. Into this solution, 0.15 g. of potassium bichromate and 0.15 g. of formic acid is introduced. The fiber is treated at a temperature of from 90° C. to 100° C. for 1.5 hours, followed by soaping.

(a′) Polypropylene fiber which is subjected to treatment (a) and (b) is introduced into 100 cc. of water containing 0.2 g. of dispersing agent having formula of

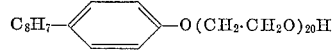

and 0.15 g. of dyestuff having Formula A in Example 13 and treated at a temperature of from 90° C. to 100° C. for 1 hour.

(b′) Treatment according to (a′) is carried out at 125° C. Among dyestuffs shown from No. 1 to No. 48, the one which is effective for mordant-dyeing by metal are as follows: No. 19, No. 28, No. 33, No. 34, No. 35, No. 42, No. 47, No. 48.

What is claimed is:

1. A method for dyeing polyolefin fiber which comprises treating the same with a hydrophobic anthraquinone dye containing a hydroxyphenylamino radical in alpha position and an alkyl radical having more than three carbon atoms in beta position on the anthraquinone nucleus.

2. A method according to claim 1 in which the polyolefin is polyethylene.

3. A method according to claim 1 wherein the polyolefin is polypropylene.

References Cited by the Examiner

UNITED STATES PATENTS

| | | | |
|---|---|---|---|
| 1,868,202 | 7/1932 | Grossmann | 260—380 |
| 2,258,551 | 10/1941 | Grossman | 260—380 |
| 2,487,045 | 11/1949 | Dickey et al. | 260—378 X |
| 2,605,269 | 7/1952 | Bauxbaum | 260—378 X |
| 3,097,044 | 7/1963 | Skeuse | 8—55 |

FOREIGN PATENTS

| | | |
|---|---|---|
| 645,540 | 7/1962 | Canada. |
| 809,495 | 2/1959 | Great Britain. |
| 838,687 | 6/1960 | Great Britain. |

NORMAN G. TORCHIN, *Primary Examiner.*

J. HERBERT, *Assistant Examiner.*